United States Patent [19]

Irie

[11] Patent Number: 4,618,303
[45] Date of Patent: Oct. 21, 1986

[54] TIRE SUPPLYING APPARATUS

[75] Inventor: Nobuhiko Irie, Nagasaki, Japan

[73] Assignee: Mitsubishi Jukogyo Kabushiki Kaisha, Japan

[21] Appl. No.: 779,523

[22] Filed: Sep. 24, 1985

Related U.S. Application Data

[62] Division of Ser. No. 511,092, Jul. 6, 1983.

[30] Foreign Application Priority Data

Jul. 6, 1982 [JP] Japan .................................. 57-117417

[51] Int. Cl.$^4$ .............................................. B65H 5/12
[52] U.S. Cl. .................................. 414/226; 156/396; 425/38; 414/279; 414/589; 414/753
[58] Field of Search ............... 414/222, 225, 226, 279, 414/589, 749, 753, 730, 35; 901/6-9, 16, 28, 29, 45-47; 294/86.4, 119.4; 425/38; 156/396

[56] References Cited

U.S. PATENT DOCUMENTS

| 3,223,767 | 12/1965 | Harris | 425/38 X |
| 4,131,402 | 12/1978 | Pirovano | 425/38 |
| 4,449,903 | 5/1984 | Hasegawa et al. | 425/38 |
| 4,472,125 | 9/1984 | Kubo et al. | 425/38 |

Primary Examiner—Robert J. Spar
Assistant Examiner—Donald W. Underwood
Attorney, Agent, or Firm—McGlew and Tuttle

[57] ABSTRACT

A tire supplying apparatus has a self-propelled green tire carrying wagon for carrying a green tire to be vulcanized, a green tire unloading device mounted on the wagon and a green tire receiving stand disposed at a predetermined position located in front of a vulcanizing press or a green tire loading device mounted on the vulcanizing press. The green tire unloading device is provided with an aligning mechanism adapted to hold the unloaded green tire so as to displace it in any radial direction while it is lifted up, the aligning mechanism serving to locate its center in correct alignment with respect to the green tire receiving stand or the green tire loading device.

3 Claims, 7 Drawing Figures

TIRE SUPPLYING APPARATUS

This is a division of application Ser. No. 511,092 filed July 6, 1983.

FIELD AND BACKGROUND OF THE INVENTION

The present invention relates to a green tire supplying apparatus and more particularly to a green tire supplying apparatus for loading a vulcanizing press or a green tire receiving stand disposed at a predetermined position located in front of the vulcanizing press, with a green tire to be vulcanized which is unloaded from a green tire carrying wagon.

To assure that green tires are successively vulcanized in a vulcanizing press by supplying them therein automatically, most hitherto known vulcanizing presses were provided with a green tire receiving stand adapted to receive a green tire to be vulcanized next. The said green tire receiving stand was located outside the vulcanizing press at a position in front of the press.

Therefore, all operations could be automatically carried out from the step of storing green tires until the step of vulcanizing them, when green tires prepared in the preceding assembling and molding process were automatically delivered from a storage room or the like in conformance with signals issued from a plurality of vulcanizing presses, so that they were unloaded on each of the green tire receiving stands disposed in front of the vulcanizing presses.

To facilitate understanding of the present invention, a conventional tire supplying apparatus will be briefly described with reference to FIG. 1.

As schematically illustrated in FIG. 1, a plurality of vulcanizing presses A are provided with green tire receiving stands B each of which is located at a predetermined position located in front of the related vulcanizing press, and a self-propelled green tire carrying wagon D moves in parallel to the array of vulcanizing presses while it is guided by means of a conductor C embedded in the floor. Green tires on the carrying wagon are unloaded on the green tire receiving stands B when it comes to a stop in front of the latter. Operations have already been automated up to the step of unloading the green tires onto the green tire receiving stands. Since unloading operation for transferring green tires E fom the carrying wagon D onto the green tire receiving stands B was manually carried out, one or two operators were needed by an array of vulcanizing presses for the unloading operation, although operation of the vulcanizing press was fully automated.

A few reasons why the unloading operation for green tires to be vulcanized has not been automated will be noted below.

(1) Since the green tire carrying wagon D is stopped at a predetermined position only at reduced positional accuracy, it is impossible to correctly unload a green tire onto the green tire receiving stand B.

(2) It is important that each of the green tire receiving stands B be located exactly relative to the center of the corresponding vulcanizing press A. In some manufacturing lines a plurality of vulcanizing presses A manufactured by different manufacturers are arranged and thereby green tire receiving stands B are disposed in a line with much difficulty. Provided that a single manufacturing line is constituted by a plurality of the same type of vulcanizing presses manufactured by the same manufacturer, it is practically difficult for the center of each of the vulcanizing presses A to be correctly located on a straight line. Thus, in practice the center of each of the vulcanizing presses is appreciably offset therefrom and thereby the position of the corresponding green tire receiving stand B is dislocated from its own specified position by an appreciable distance.

SUMMARY OF THE INVENTION

The present invention has been made with the foregoing background in mind and its object resides in providing a tire supplying apparatus which assures that green tires on a self-propelled green tire carrying wagon are automatically unloaded onto a green tire receiving stand disposed in front of an array of vulcanizing presses or directly on a green tire loading device mounted on a vulcanizing press.

Another object of the present invention is to provide a tire supplying apparatus which assures that green tires on a self-propelled green tire carrying wagon are automatically loaded directly on a bead ring on a die in a vulcanizing press without any necessity for a green tire receiving stand or a green tire transferring device mounted on the vulcanizing press.

Other objects, features and advantages of the present invention will be more clearly apparent from reading the following description prepared in conjunction of the accompanying drawings.

BRIEF DESCRIPTION OF THE DRAWINGS

The accompanying drawings will be briefly described below.

DESCRIPTION OF THE PREFERRED EMBODIMENTS

The present invention will now be described in greater detail first with reference to FIGS. 2 to 4 which illustrate the first embodiment of the invention.

Figure 1:
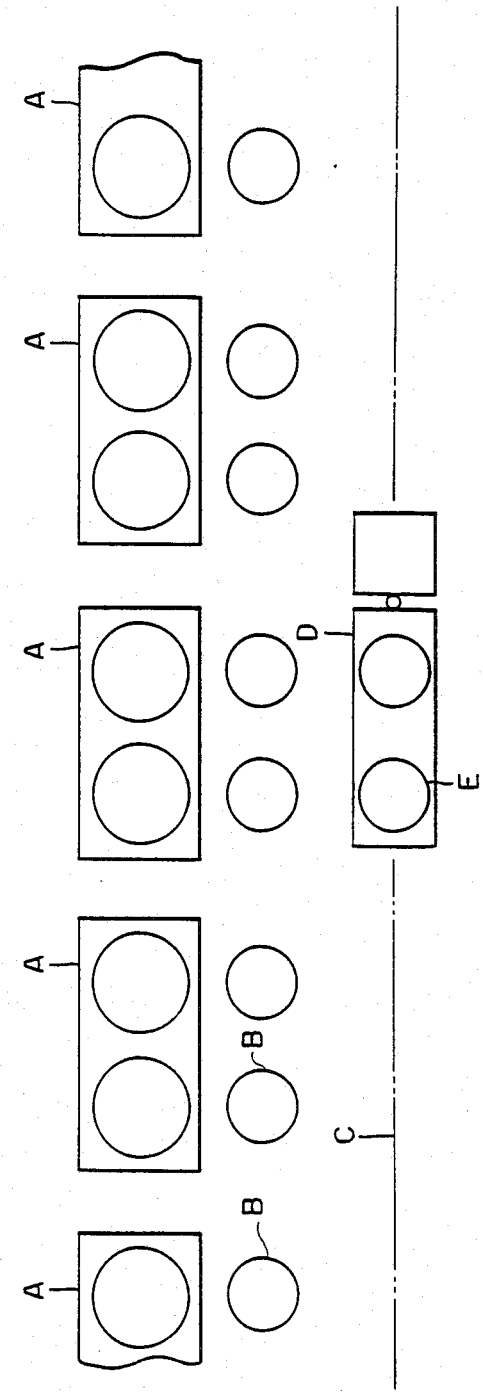
FIG. 1 is a plan view schematically illustrating a conventional green tire supplying system.
Figure 2:
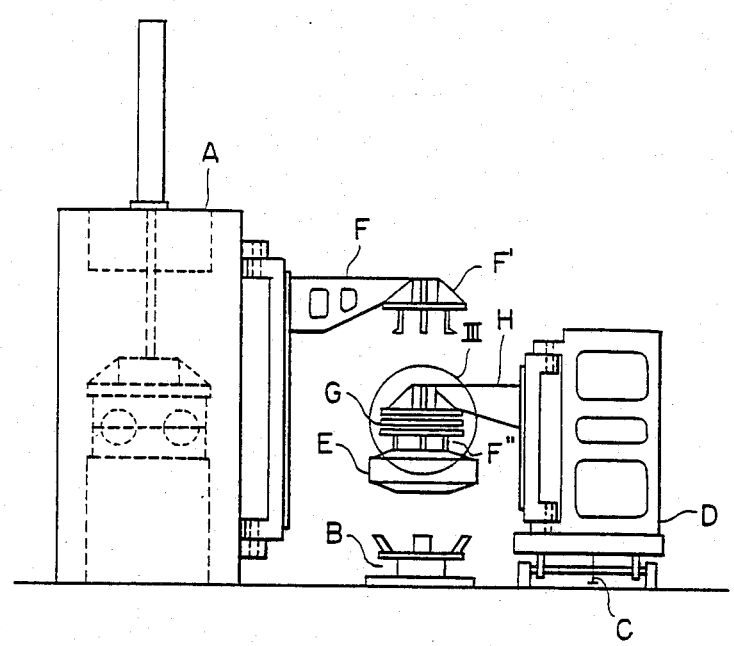
FIG. 2 is a front view of a tire supplying apparatus in accordance with a first embodiment of the invention.

As shown in FIG. 2, a tire supplying apparatus includes a hitherto known automatic vulcanizing press A, an automatic green tire loading device F attached to said automatic vulcanizing press A, a green tire holding device F', a green tire receiving stand B, and an automatic green tire unloading device H mounted on a green tire carrying wagon D. The green tire unloading device H is similar to the green tire loading device F, and has a device F" similar to the green tire holding device F'. It also has an automatic aligning device G. A conventional conductor is embedded in the floor and a guiding device C mounted on the wagon D follows the conductor. A number of vulcanizing presses A and a number of green tire receiving stands B are arranged in line in the same manner as the conventional vulcanizing system as illustrated in FIG. 1.

Figure 3:
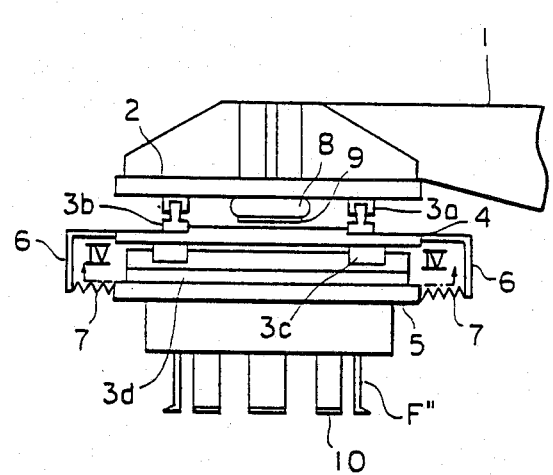
FIG. 3 is an enlarged illustration of the parts in area III of FIG. 2.
Figure 4:
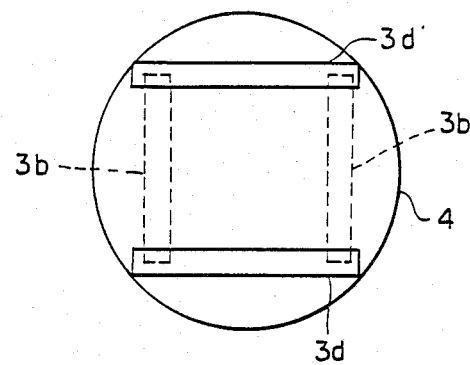
FIG. 4 is a sectional view taken on line IV—IV in FIG. 3, shown from the bottom.

As is best seen in FIG. 3, the automatic aligning device G includes a circular disc 2 fixedly secured to the fore end part of an arm 1 below which a pair of bearing rails 3a, that are called linear motion bearings are attached to the bottom thereof in parallel to one another. A pair of rails 3b are fitted into the pair of bearing rails 3a and another circular disc 4 is attached to the bottom of the rails 3b. Further, a pair of bearing rails 3c are attached to the bottom of the circular disc 4 in the same manner as the foregoing combination of the circular disc 2 and the bearing rails 3a. Another pair of rails 3d are fitted into the bearing rails 3c which extend at a right angle relative to the rails 3b and a mounting plate 5 for the green tire holding device F" is fixedly secured to the bottom of the rails 3d. A plurality of coil springs 7 are disposed between brackets 6 fixed to the peripheral part of the circular disc 4 and the mounting plate 5 in such a manner that they are caused to expand or contract resiliently in the same direction as that of the rails 3d.

It should be noted that a plurality of coil springs are disposed between both the circular plates 2 and 4 in the same direction as that of the rails 3b in the same manner as in the foregoing, although they are not shown in the drawing for the purpose of simplification of illustration.

Further, a pneumatic spring 8 is attached to the bottom of the circular plate 2 so as to inhibit lateral movement of the circular disc 4. The pneumatic spring 8 is fitted with a frictional plate 9 at the bottom surface thereof which is adapted to come out of contact with the circular plate 4 when it is not filled with compressed air.

It should be noted that a braking device similar to the aforesaid pneumatic spring 8 is provided between the circular plate 4 and the mounting plate 5, although it is not shown in the drawing for the purpose of simplification of illustration.

With the green tire unloading device H constructed in the above-described manner, it is found that a green tire E can be displaced with very light resistance caused along the rails against displacement after it is hung up by means of the green tire holding device F". In some cases it was found that the bearing nuts had a reduced frictional coefficient in the range of 0.003 to 0.005 when the rails 3b carried the hung-up material having a weight of 300 Kg (including the weight of a green tire). Accordingly, the green tire holding device F" can be displaced in the direction of rails 3b, the direction of rails 3d or a combined direction of rails 3b and 3d as a certain force is exerted thereon from the outside.

Thus, when a green tire on the green tire carrying wagon D is held by way of the steps of causing a plurality of grasping pawls 10 on the green tire holding device F" to contract, inserting them into the bead portion of the green tire and causing them to expand and thereafter it is displaced upward from the green tire carrying wagon D, self-aligning is effected with the aid of the above-described self-aligning mechanism under the influence of expansion force of the grasping pawls 10 until the center of the green tire holding device F" is located in correct vertical alignment with the center of the green tire, as long as the former is offset from the latter by a short distance.

Then, the pneumatic spring 8 is filled with compressed air whereby the automatic aligning mechanism is locked while the frictional plate 9 on the bottom of the pneumatic spring 8 comes in contact with the circular plate 4. Thus, when the arm 1 moves forward to the position located above the green tire receiving stand B and comes to a stop, both the green tire and the green tire holding device F" are kept immovable at the stopped position, because the automatic aligning mechanism is locked. Next, the arm 1 is lowered onto the green tire receiving stand B. When the automatic aligning mechanism is released from the locked state during the lowering movement of the arm 1, the green tire holding device F" assumes its correct center position under the influence of expansive or compressive force of the coil springs 7, provided that appreciable misalignment takes place when a green tire is hung up from the green tire carrying wagon D by means of the green tire holding device F".

The lowered green tire is received on the green tire receiving stand B by causing a plurality of bead engagement pawls on the green tire receiving stand B to expand the lower bead portion of the green tire. If the center of the green tire receiving stand B is located in incorrect alignment with the center of the green tire holding device F", self-aligning is effected under the influence of expansive force of the bead engagement pawls on the green tire receiving stand B until correct alignment is restored, whereby the green tire is correctly received on the center of the green tire receiving stand B without any particular difficult.

Next, the grasping pawls 10 on the green tire holding device F" are caused to contract and thereby the lowered green tire is transferred to the green tire receiving stand B. The green tire holding device F" is then displaced backward to the position where the green tire carrying wagon D can move easily. Next, the green tire carrying wagon D moves to the position located in front of another vulcanizing press A or to the place where green tires are stored.

The green tire held on the green tire receiving stand B is transferred to the interior of the vulcanizing press A in accordance with a hitherto known process so that it is subjected to vulcanization therein.

Therefore, when the green tire supplying apparatus in accordance with the above-described embodiment of the invention makes it possible to unload a green tire on the green tire receiving stand B with the aid of the green tire holding device F" mounted on the green tire carrying wagon D while correct alignment is automatically achieved. Thus, fully automatic operations can be carried out from the beginning step of storing green tires till the final step of vulcanization, resulting in manufacturing cost of tires being substantially reduced.

It should be noted that in the above-described embodiment the tire supplying operation is carried out by way of the steps of holding a green tire on the green tire receiving stand B by supporting it from the bottom at the lower bead portion and the thread shoulder thereof, hanging it up with the aid of the green tire loading device F at a predetermined time during the vulcanizing process by grasping it at the upper bead portion, loading it on the center position of the lower die half fixedly mounted on the vulcanizing press A while the upper die half is held away from the lower die half until it is placed on the lower bead ring on the latter and finally causing it to be released from the green tire loading device F (hereinafter referred to as a first system) but the present invention should not be limited only to the first system and the latter may be replaced with any of the second to fourth systems each of which will be described later.

Specifically, in the second system the green tire receiving stand is not required but the green tire loading device F includes a rotatable green tire grasping portion F'. Tire supplying is carried out by way of the steps of holding a green tire by supporting it from the bottom at the lower bead portion and the tread shoulder thereof while the green tire grasping portion F' assumes the upward posture which is directed reversely relative to that in FIG. 2 at the position occupied by the green tire receiving stand B in the foregoing system, rotating the green tire grasping portion F' by 180° at a predetermined time during the vulcanizing process to hang it up, loading it on the center position of the lower die half fixedly mounted on the vulcanizing press A while the upper die half is held away from the lower die half until it is placed on the lower bead ring on the latter and finally causing the green tire grasping portion F' to be removed therefrom. Further, in the third system tire supplying is carried out by way of the steps of loading a green tire on the upper die half on the vulcanizing press A by fitting it onto the upper bead ring while the green tire grasping portion F' on the green tire loading device F is not rotated and therefore assumes the upward posture and then causing the green tire grasping portion F' to be removed from the green tire. Finally, in the fourth system tire supplying is carried out by way of the steps of holding a green tire on the green tire receiving stand B in the same manner as in the first system, hanging it up with the aid of the green tire loading device F, rotating the green tire grasping portion F' on the green tire loading device F by 180° to assume the upward posture, loading it on the upper die half on the vulcanizing press A by fitting it onto the upper bead ring while both the upper and lower die halves are kept away from one another in the opened state and finally causing the green tire grasping portion F' to be removed from the fitted green tire.

In all embodiments of the invention, the unloading device includes an automatic aligning device or automatic aligning means such as those shown at G, which are connected between an unloading (or loading) arm of the unloading device and a holding or grasping device such as that shown at F''. The aligning means is capable of moving in any radial direction so as to bring the center of the holding device into correlation with the center of a selected position for the green tire on or in the vulcanizing press A.

Moreover, the coil springs 7 in the first embodiment of the invention may be replaced with pneumatic cylinders. Specifically, a plurality of pneumatic cylinders are disposed in alignment with the direction of the rails in such a manner that a cylinder casing is fixedly secured to the bracket 6 while a cylinder rod is not connected to any member but its foremost end part abuts against the peripheral part of both the circular discs 2 and 5. The cylinder rod is designed so that when it is located at the foremost end position of forward movement thereof, the center of the circular plates 2 and 5 assumes their own specified center position (the aforesaid foremost end position of forward movement may be a stroke end of the cylinder rod), whereas when it is located at the rearmost end position of backward movement thereof, displacement of the circular plates 2 and 5 with force exerted thereon from the outside is not inhibited thereby. The arrangement of the pneumatic cylinders in the above-described manner assures the same functional effects as in the first embodiment and since resilient reaction force does not occur due to displacement of the circular plates 2 and 5 as is different from the first embodiment, correct alignment can be achieved easier than in the first embodiment and moreover vibratory displacement can be substantially reduced during return movement of the pneumatic cylinders.

Next, the second embodiment of the present invention will be described below with reference to FIGS. 5 to 7.

In this embodiment a tire supporting apparatus is constructed such that tire supplying operation is carried out by way of the steps of bringing a green tire carrying wagon D to the position located in front of the vulcanizing press A with the aid of a conductor embedded in the floor and a guiding device C, causing it to come to a stop there, lifting up the righthand moving wheels by means of a jack-up device I fixedly embedded in the floor at the position located in front of the vulcanizing press, grasping a green tire E on the green tire carrying wagon D with the aid of a green tire loading and unloading device J mounted on the carrying wagon D to lift it up and then loading it at the center of a die on the vulcanizing press A. It should be noted that a plurality of vulcanizing presses A are arranged in line in the substantially same manner as in the foregoing embodiment.

Figure 6:
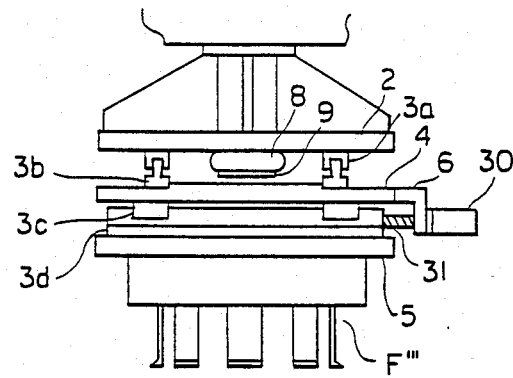
FIG. 6 is an enlarged illustration of the parts in area VI of FIG. 5.

As is best seen from FIG. 6, a servo-motor 30 is fixedly secured to a bracket 6 on the peripheral part of the circular plate 4 and a screw rod 31 is operatively connected to the servo-motor 30 so that a mounting plate 5 is actuated by way of a combination of the screw rod 31 and the nut 32 fixed to the mounting plate 5 as the servo-motor 30 rotates. Further, displacement of the circular plate 4 relative to the circular plate 2 is carried out by means of another servo-motor 33 in the same manner as the mounting plate 5.

Figure 7:
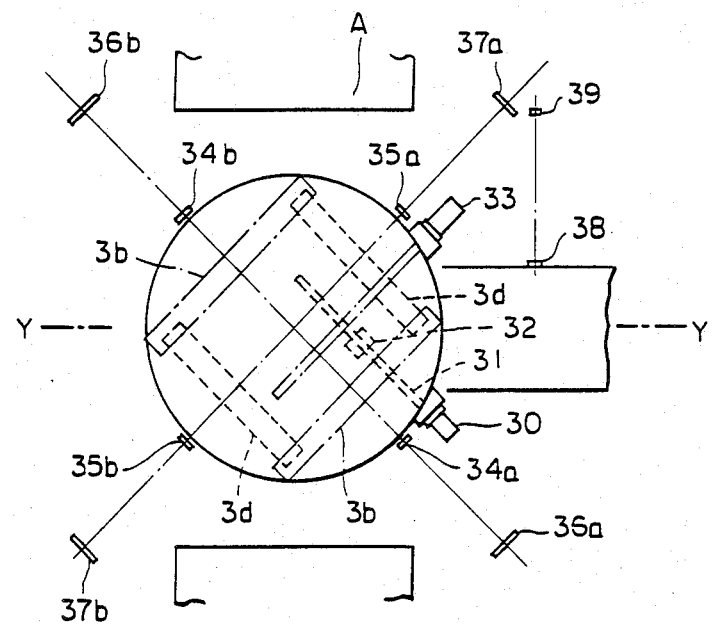
FIG. 7 is a sectional view of a part of the tire supplying apparatus schematically illustrating how automatic alignment is achieved in the second embodiment of the invention.

Rails 3b and 3d are arranged in an X-shaped pattern as illustrated in FIG. 7 relative to the direction of movement of the green tire loading and unloading device J (Y—Y direction in FIG. 7).

Transmitting and receiving (transmitting receiving) devices 34a and 34b of electric wave, sound wave or light beam are mounted on the mounting plate 5 at the positions located on extension of diagonal lines passing through the center axis of the mounting plate 5.

Further, another transmitting and receiving devices 35a and 35b are mounted on the circular plate 4 in the same manner as the mounting plate 5.

On the other hand, the vulcanizing press A is provided with reflector plates 36a, 36b, 37a and 37b located opposite to the transmitting and receiving devices 34a, 34b, 35a and 35b on the horizontally extending lines passing through the center thereof. Specifically, the reflector plates 36a, 36b, 37a and 37b are located on the vulcanizing press A in such a manner that a distance between the transmitting and receiving device 34a and the reflector plate 36a is equal to a distance between the transmitting and receiving device 34b and the reflector plate 36b while a distance between the transmitting and receiving device 35a and the reflector plate 37a is equal to a distance between the transmitting and receiving device 35b and the reflector plate 37b, as long as the circular plate 4 and the mounting plate 5 are located at their own specified center.

Owing to the arrangement of the transmitting and receiving devices and the reflector plates the green tire grasping device F''' is located in correct alignment with the center of a die on the vulcanizing press A by way of the steps of causing the green tire grasping device F''' to stop its movement at the position in the proximity of the vulcanizing press A, releasing the locking mechanism (comprising braking means 8 and 9) for the circular plate 4 and the mounting plate 5, causing each of the transmitting and receiving devices 34a, 34b, 35a and 35b to transmit signals therefrom and receive reflected signals from the reflector plates 36a, 36b, 37a and 37b and then actuating the servo-motors 30 and 33 until all differences in reflecting time disappears.

After completion of correct alignment the green tire grasping device F''' is caused to move toward the bead ring on the die (or away from it) by actuating the locking mechanism until the bead portion of a green tire is correctly placed on the bead ring. To allow the green tire grasping device F''' to stop its movement at the position in the proximity of the center of the die a reflecting type transmitting device 38 is mounted on a carriage by which the green tire grasping device F''' moves and a reflector plate 39 is provided at a predetermined position on the vulcanizing press so that actuation of a driving device for the carriage is controlled. On the other hand, the green tire carrying wagon D receives at least a green tire at the green tire storing place and moves to the position located in front of the vulcanizing press A to come to a stop while it is guided by a conventional method during its movement.

Figure 5:
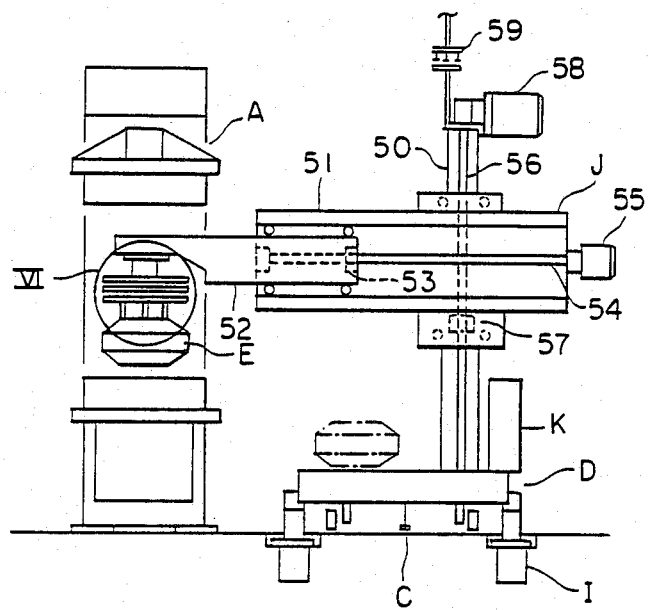
FIG. 5 is a front view of a tire supplying apparatus in accordance with a second embodiment of the invention.

After the green tire carrying wagon D is stopped, the righthand moving wheels as seen in the FIG. 5 are lifted by means of jack-up device I embedded in the floor at the position located in front of the vulcanizing press.

A height of lifting achieved by the jack-up device I is previously determined to such an extent that the green tire grasping device F''' on the green tire loading and unloading device J assumes the horizontal posture in parallel to a die on the vulcanizing press A when it moves to the position in the proximity of the center of the die.

The jack-up device I is arranged for each of the vulcanizing presses A and moreover it is adapted to carry out control operations therefor individually. The green tire loading and unloading device J is mounted on the green tire carrying wagon D and the latter carries at least a green tire to be vulcanized.

The green tire loading and unloading device J includes a horizontally extending guide rail 51 slidably mounted on a vertically extending guide rail 50 on the green tire carrying wagon D and a carriage 52 adapted to slide across said horizontally extending guide rail 51, the carriage 52 carrying the green tire grasping device F'''at its foremost end part. Further, the carriage 52 has a nut 53 attached thereto and a screw rod 54 extends through the nut 53 while it is rotatably supported on the horizontally extending guide rail 51 so that it is driven by means of a motor 55 fixedly mounted on the right end part of the horizontal guide rail 51 as seen in the drawing. On the other hand, another screw rod 56 is rotatably supported on the vertically extending guide rail 50 and a nut 57 through which the screw rod 56 extends is fixedly secured to the horizontal guide rail 51 at the predetermined position. The screw rod 56 is driven by means of a motor fixedly mounted on the top end part of the vertically extending guide rail 50.

A collector device 59 is disposed above the upper end of the vertical guide rail 50 so that electricity is supplied from the ceiling.

Reference letter K designates a control panel mounted on the green tire carrying wagon.

As will be apparent from the above description, in the tire supplying apparatus in accordance with the second embodiment tire supplying is carried out by way of the steps of causing the green tire carrying wagon D to move on the floor by itself, stopping its movement, inclining the green tire loading and unloading device on the tire carrying wagon until it assumes the correct horizontal posture, grasping a green tire on the green tire carrying wagon by means of the green tire grasping device, lifting it up, displacing it toward the center of the vulcanizing press A and finally loading it on a die while the center of the green tire is located in correct vertical alignment with the center of the die. Thus, fully automatic operations can be carried out from the step of storing green tires until the step of vulcanizing. There is no necessity of disposing a green tire receiving stand and a green tire transferring device for each of the vulcanizing presses A.

In the second embodiment as described above a green tire to be vulcanized is placed on the lower bead ring on the vulcanizing press A with the aid of a green tire loading and unloading device J. Alternatively, the green tire loading and unloading device J may be modified so as to turn by 180° so that a green tire is fitted onto the upper bead ring on the vulcanizing press A.

While the present invention has been described above with respect to two preferred embodiments, it should be of cource understood that the invention should not be limited only to them and various changes or modifications may be made in a suitable manner without any departure from the spirit and scope of the invention.

What is claimed is:

1. A green tire supplying apparatus for supplying a green tire to a selected position with respect to a vulcanizing press, the selected position having a center corresponding to a center of a green tire to be supplied to the selected position comprising:
   a self-propelled green tire wagon for carrying a green tire; and
   a green tire unloading means mounted on said wagon for transferring a green tire from said wagon to the selected position;
   said green tire unloading means comprising an arm which is movable with respect to said wagon, a green tire holding device for holding a green tire, said holding device having a plurality of pawls movable to engage and disengage from a green tire, said pawls having a center of operation corresponding to a center of a green tire to be held by said holding device, said green tire unloading means also comprising automatic aligning means connected between said arm and said holding device for moving said center of operation in any radial direction with respect to said arm so as to bring said center of operation into correlation with the center of the selected position;
   said automatic aligning means comprises a first disc element fixed to said arm, a second disc element mounted to said first disc element for movement in a first radial direction, a plate fixed to said holding device and mounted to said second disc element for movement in a second radial direction which is perpendicular to said first radial direction, and brake means engageable between said first disc element, said second disc element and said plate, for maintaining a relative radial position therebetween;

biasing means connected between said first disc element and said second disc element for biasing said first and second disc elements into a selected position in said first radial direction; and biasing means connected between said second disc element and said plate for biasing said secod disc element and said plate into a selected position with respect to said second radial direction.

2. An apparatus according to claim 1, wherein said brake means includes a pneumatic inflatable spring connected to one of said first and second disc elements and inflatable to engage the other of said first and second disc elements.

3. An apparatus according to claim 1 wherein said first disc element includes a pair of spaced apart rails connected thereto, said second disc element having a pair of spaced apart rails engaged respectively with said first disc element rails extending in said first radial direction, a second pair of rails connected to said second disc element, and a second pair of rails engaged respectively with said second pair of second disc element rails and extending in said second radial direction, said first and second disc element rails movable along their respective rails.

* * * * *